United States Patent
Charters et al.

(10) Patent No.: US 8,601,462 B2
(45) Date of Patent: *Dec. 3, 2013

(54) MODIFYING A MULTI-MODULE APPLICATION

(75) Inventors: Graham C. Charters, Southampton (GB); David A. Draper, Southampton (GB); Jeremy P. Hughes, Winchester (GB); Alasdair Nottingham, Southampton (GB); Mark P. Nuttall, Eastleigh (GB); Ian Robinson, Southampton (GB); Timothy J. Ward, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/908,166

(22) Filed: Oct. 20, 2010

(65) Prior Publication Data

US 2011/0314463 A1    Dec. 22, 2011

(30) Foreign Application Priority Data

Jun. 17, 2010 (EP) .................................... 10166259

(51) Int. Cl.
  *G06F 9/44* (2006.01)
(52) U.S. Cl.
  USPC ............ 717/170; 717/120; 717/122; 717/168
(58) Field of Classification Search
  None
  See application file for complete search history.

(56) References Cited

U.S. PATENT DOCUMENTS

| | | | |
|---|---|---|---|
| 5,805,889 A * | 9/1998 | Van De Vanter | 717/107 |
| 6,182,286 B1 * | 1/2001 | Sigal et al. | 717/122 |
| 6,460,052 B1 * | 10/2002 | Thomas et al. | 707/695 |
| 7,131,111 B2 * | 10/2006 | Passanisi | 717/121 |
| 7,334,222 B2 | 2/2008 | Keller | |
| 7,721,003 B2 | 5/2010 | Girle et al. | |
| 8,185,819 B2 * | 5/2012 | Sah et al. | 715/243 |
| 2004/0123285 A1 * | 6/2004 | Berg et al. | 717/174 |
| 2005/0097543 A1 * | 5/2005 | Hirayama | 717/168 |

(Continued)

FOREIGN PATENT DOCUMENTS

EP    2113840 A1    11/2009
TW    201142709 A    12/2011

OTHER PUBLICATIONS

"Apache Sling—Installing and Upgrading Bundles," pp. 1-3, Apache.org, Jun. 1, 2009.*
Robinson, "WebSphere: up to its EARs in OSGi," Dec. 27, 2009.*

(Continued)

*Primary Examiner* — Insun Kang
(74) *Attorney, Agent, or Firm* — Yee & Associates, P.C.; Libby Z. Toub

(57) ABSTRACT

A method, apparatus and computer program are disclosed for modifying an application comprising a plurality of modules. A user is presented with a list of modules. The user is able to specify input regarding any permitted version modifications for the modules listed. It is then determined whether the requested modifications are possible with one or more failure messages being output when any of the requested modifications are not possible. At least one of the failure messages is used to enable modification of the initial input provided by the user. In one embodiment, information is provided to the user based on one or more failure messages in order to enable the user to modify their choices. In another embodiment, the initial input is automatically modified. A permitted version modification may be, for example, a version upgrade, a version downgrade, and an indication that there is no preference.

14 Claims, 4 Drawing Sheets

(56) References Cited

U.S. PATENT DOCUMENTS

| | | |
|---|---|---|
| 2006/0161898 A1 | 7/2006 | Bauman et al. |
| 2007/0136337 A1* | 6/2007 | Sah et al. ............... 707/101 |
| 2008/0046882 A1 | 2/2008 | Blackhouse |
| 2008/0189419 A1 | 8/2008 | Girle et al. |
| 2009/0077044 A1* | 3/2009 | Krishnaswamy et al. ........ 707/3 |
| 2009/0276769 A1* | 11/2009 | Brannen et al. ............. 717/174 |
| 2010/0125839 A1* | 5/2010 | Gebis et al. ................. 717/170 |
| 2010/0138818 A1* | 6/2010 | Harrop et al. ............... 717/153 |
| 2011/0296398 A1* | 12/2011 | Vidal et al. ................. 717/171 |
| 2012/0204168 A1 | 8/2012 | Charters et al. |

OTHER PUBLICATIONS

"Modify and re-deploy a single bundle from an application to update it without re-deploying the application," copyright IBM Jun. 10, 2010.*

Dynamic programming algorithm (DPA) for Edit-Distance, pp. 1-5, retrieved Sep. 21, 2010 http://www.csse.monash.edu.au/~lloyd/tildeAIgDS/Dynamic/Edit/.

USPTO Office Action, U.S. Appl. No. 13/449,877, Feb. 19, 2013, 10 pages.

* cited by examiner

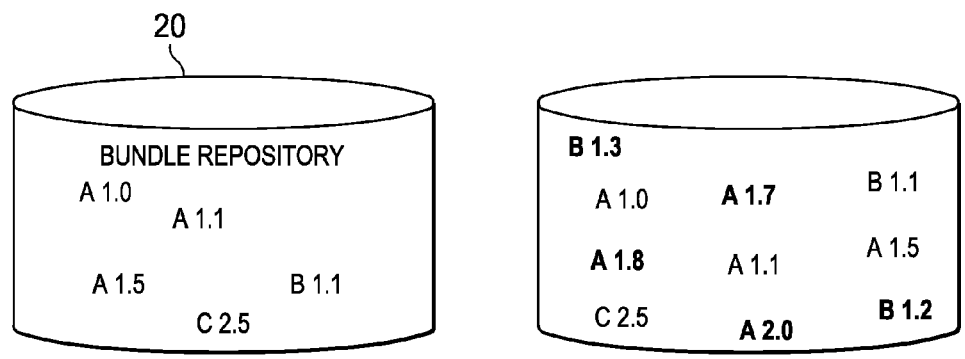

MODIFYING A MULTI-MODULE APPLICATION

BACKGROUND

1. Field

The invention relates to modifying an application and more specifically to modifying one or more modules in an application.

2. Description of the Related Art

The OSGi Alliance is a standards organization that has defined a dynamic module framework for Java™. (Java and all Java-based trademarks and logos are trademarks of Sun Microsystems, Inc. in the United States, other countries, or both.)

The unit of modularity defined by OSGi is an OSGi "bundle" which is a jar archive containing OSGi metadata as additional headers in the jar manifest. The concept of an "application" comprised of multiple bundles is not standardized yet in OSGi, but technologies such as SpringSource dm Server and Apache Aries have defined an application as a collection of OSGi bundles (code modules; a code module may comprise a single piece of code or a plurality of files).

An OSGi bundle has a version, exports (makes available for use by other bundles, packages, etc.) Java packages at a version and imports (declares a dependency upon) Java packages at a fixed version or within a range of versions. Packages correspond to directories within a bundle. Those directories include files.

An application descriptor indicates the bundles that make up a particular application and the required version or version range for each bundle. The required OSGi bundles can be resolved from a bundle repository using the application descriptor (note that multiple repositories may be used).

As shown in FIG. 1a, application descriptor 10 indicates that there are 3 bundles A, B and C in application X. Each bundle is required at a specified version or within a particular version range. Thus, bundle A should be within the range 1.0 to 2.1 (exclusive); bundle B should be in the range 1.1 to 1.4 (exclusive); and bundle C should be at version 2.5. Note, in OSGi parlance, a range is typically specified [x, y). This means from x up to but not including y. The ending) indicates "not inclusive", whilst the ending] indicates "inclusive". Further, [and] are both inclusive and (and) are both exclusive.

A bundle repository 20 comprises bundles at various versions. In this example, A is present at versions 1.0, 1.1 and 1.5; B is present at 1.1; and C is present at version 2.5. Typically an application will be resolved to include the latest acceptable version of each bundle (as defined by the application descriptor) which is present in the bundle repository. Therefore, as shown in FIG. 1b, application X will comprise bundle A at version 1.5; bundle B at version 1.1; and bundle C at version 2.5.

Having resolved application X, there may subsequently be a reason to upgrade one of the bundles in application X. For example, a problem may be discovered with bundle B at version 1.1 such that it is desirable to upgrade to a more recent version.

The bundle repository may have had many bundles added into the repository in the period subsequent to when application X was first resolved. This is shown in FIG. 1c. The bundle repository contains the following new bundles which were not present in the repository shown in FIG. 1a: A at version 1.7; A at version 1.8; A at version 2.0; and B at versions 1.2 and version 1.3.

When application X is re-resolved, current OSGi resolvers such as that included in the Apache Felix OSGi Bundle Repository's OBR Service API aggressively resolve all bundles to the latest acceptable version (as specified in the application descriptor). This means that the entire dependency network is resolved to the latest consistent set of versions (e.g. the set that meets all the dependency requirements). This is not necessarily desirable since each application will have been tested and quality assured using specific bundles. Even though a bundle has specified a range that it supports, it may not have actually been tested for all versions within the range; rather there may be a long term plan to eventually test the bundle with all versions within the supported range.

SUMMARY

According to a first aspect, the invention provides a method for modifying an application comprising a plurality of modules, the method comprising: the computer presenting a user with a list of the plurality of modules; the computer enabling the user to specify input regarding any permitted version modifications for the modules listed; the computer determining whether the requested modifications are possible, one or more failure messages being output when any of the requested modifications are not possible; and the computer using at least one of the failure messages to enable modification of the initial input provided by the user.

One example of a module is an OSGi bundle.

In one embodiment, the user is presented with information based on at least one of the failure messages. Input is received from the user with respect to how to modify the initial input provided by the user. The modified input is provided to a component responsible for determining whether any specified modifications are possible. Such a component could, for example, be an OSGi resolver.

In this embodiment, it is preferably determined from a failure message that a required entity (e.g. a package) is missing. It is identified whether the required entity is provided by a module at a version that is accessible to the application. Responsive to identifying that the required entity is provided by a module at a version that is accessible to the application, an indication is provided to the user that the accessible module version should be selected. In one embodiment "accessible" means that the version is within a repository that the implementing system has access to and that the version is within the acceptable range specified by metadata associated with the application (e.g. an application descriptor).

In another embodiment, the system uses at least one of the failure messages to automatically modify the input initially provided. The modified input is provided to a component responsible for determining whether any specified modifications are possible. Again, by way of example, this could be an OSGi resolver.

In this embodiment, it is determined from a failure message that a required entity (e.g. a package) is missing. It is identified whether the required entity is provided by a module at a version that is accessible to the application. If so, this accessible module is selected. Again, in one embodiment, "accessible" preferably means that module version is within a repository that the implementing system can access and is also within an acceptable range specified by, for example, an application descriptor for the application or other metadata.

Preferably in the automatic embodiment, the minimal set of changes is selected which are necessary based on the failure messages produced.

Preferably, failure messages are identified which relate to a module listed or which relate to an entity made available by a module listed.

Preferably, a failure message is disregarded when the error to which it relates has already been highlighted by another failure message.

In a preferred embodiment, any of the following version modifications are permitted: a version upgrade, a version downgrade; and an indication that there is no preference.

It may also be decided that a certain module should be fixed at an existing level. According to a second aspect, the invention provides an apparatus for modifying an application comprising a plurality of modules, the apparatus comprising: a computer, a component for presenting a user with a list of the plurality of modules; a component for enabling the user to specify input regarding any permitted version modifications for the modules listed; a component for determining whether the requested modifications are possible, one or more failure messages being output when any of the requested modifications are not possible; and a component for using at least one of the failure messages to enable modification of the initial input provided by the user.

According to a third aspect, the invention provides a computer program for modifying an application comprising a plurality of modules, the program comprising program code means adapted to perform the following method steps when said computer program is run on a computer: presenting a user with a list of the plurality of modules; enabling the user to specify input regarding any permitted version modifications for the modules listed; determining whether the requested modifications are possible, one or more failure messages being output when any of the requested modifications are not possible; and using at least one of the failure messages to enable modification of the initial input provided by the user.

BRIEF DESCRIPTION OF THE SEVERAL VIEWS OF THE DRAWINGS

A preferred embodiment of the present invention will now be described, by way of example only, and with reference to the following drawings:

FIGS. 1a, 1b and 1c illustrate an exemplary OSGi application, an associated application descriptor and a bundle repository;

FIG. 2 illustrates, in accordance with a preferred embodiment, the mechanism by which a user may select which bundles to upgrade;

DETAILED DESCRIPTION

A solution is provided which enables a user to specify which bundles they want to upgrade. This is as opposed to automatically aggressively resolving all bundles to the most recent, acceptable version present in the bundle repository.

As shown in FIG. 2, the user is preferably presented with a list of bundles for a particular application and is informed of the currently deployed version for each bundle. The user is then able to select whether they wish to upgrade one or more of the bundles to a new version. They are presented with a popup box 30 for each "new version" entry selected and the popup box is populated with the versions that are available in the bundle repository for the selected bundle. In the case of bundle B, these available versions are 1.1 and 1.2. The user is also able to select the "no preference" option which means that the system may choose whether and how to upgrade the selected bundle. Note, the [ ] symbols simply indicate that a version is selectable.

Figure 3:
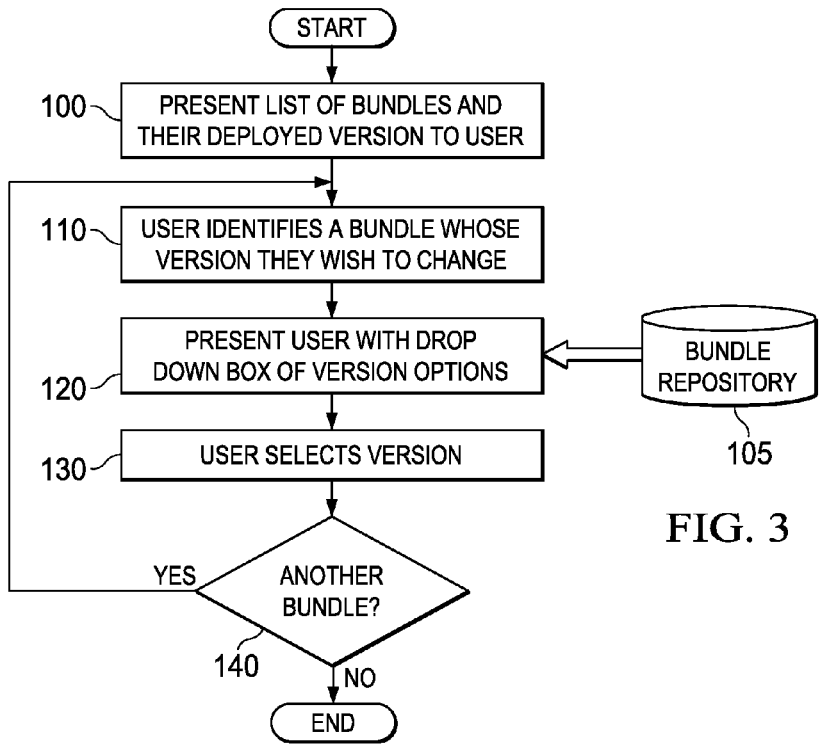
FIG. 3 illustrates, in accordance with a preferred embodiment, the processing by which a user is able to select which bundles to upgrade.

FIG. 3 indicates the processing, in accordance with a preferred embodiment, which occurs when the user is presented with a list of bundles and begins to select which bundles they wish to upgrade.

At step 100, the list of bundles is presented to the user, along with their deployed versions. At step 110, the user identifies a bundle whose version they wish to change, and is presented at step 120 with a drop down box of version options. The bundle repository 105 provides input to the version options presented at step 120. Note, in a preferred embodiment, the bundle repository 105 is queried just once at the start of the process (i.e. before step 100) and this information is used at step 120.

At step 130, the user selects the version they require or indicates no preference. The process then loops round at step 140 to step 110 or ends, as appropriate.

Once the user has selected which of an application's bundles to upgrade and which ones to leave, there are at least a couple of possible options as to how that information is processed.

Figure 4:
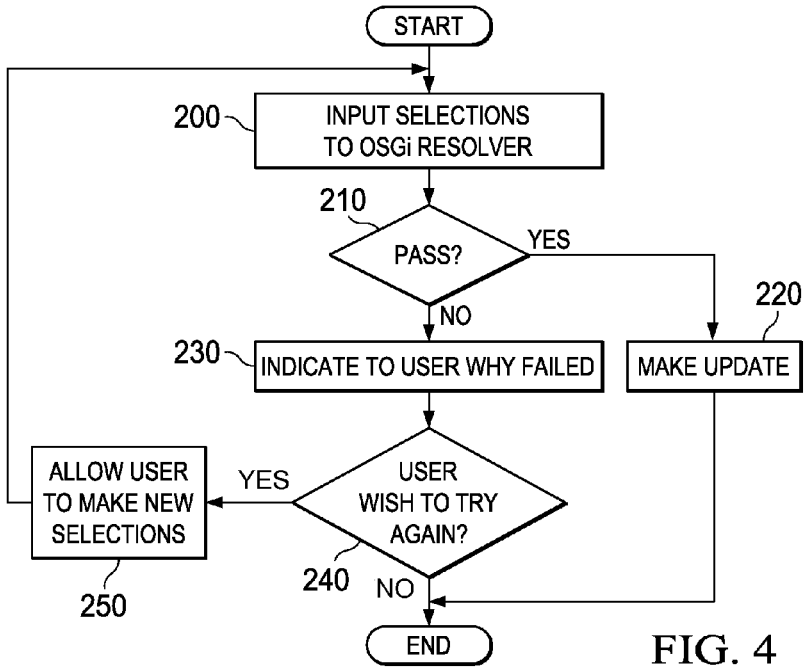
FIGS. 4 and 6 show, in accordance with a first embodiment, the way in which an application may be upgraded.

The processing that takes place, in accordance with a first embodiment, is shown in FIG. 4. The selections made by the user are provided at step 200 as input to the OSGi resolver. The Java interface org.osgi.servicex.obr.Resolver is defined in the OSGi document "RFC-0112 Bundle Repository". The resolver is defined at section 5.4 of RFC-0112. It will be appreciated by one of ordinary skill in the art that the use of such a resolver is by way of example only. Any component could be used which can determine whether the requested modifications are possible when taking into account the other bundles selected and their dependencies.

It is determined at step 210 whether the selections made by the user are acceptable. If the selections are acceptable, then the update is made to the application at step 220 and the processing ends.

If the selections were found to be unacceptable for some reason at step 210, then an indication of why the request failed is provided to the user at step 230. More detail with respect to the determination made at step 210 is provided with respect to FIG. 6 and will be discussed subsequently.

The user is then permitted at step 250 to make new selections, and then the processing loops round to step 200. Alternatively, the user may choose at step 240 to end the process.

Figure 5:
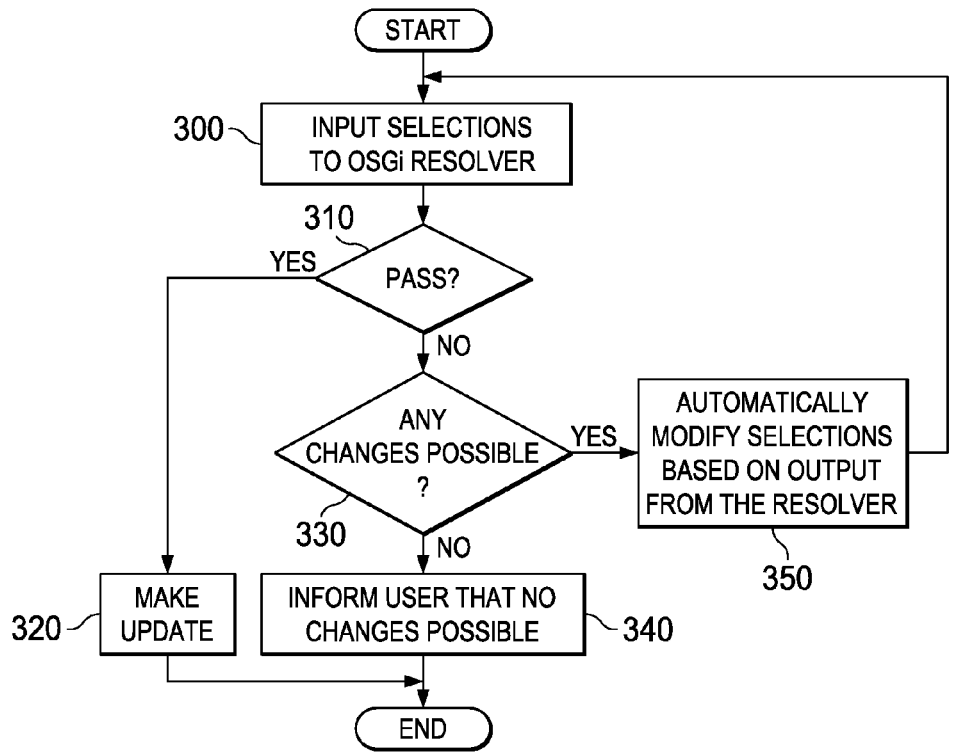
FIGS. 5 and 7 show, in accordance with a second embodiment, the way in which an application may be upgraded.

The processing that takes place, in accordance with a second embodiment, is shown in FIG. 5. The selections made by the user are once again input to the OSGi resolver at step 300. A determination is made as to whether the selections are acceptable at step 310. If they are, then the application is updated at step 320 and the processing ends. Note, the user may alternatively be informed of the proposed update(s) and will then have the choice to accept or veto it. Again, the use of the OSGi resolver is by way of example only.

If the selections are deemed unacceptable at step 310, then it is determined whether any changes at all are possible at step 330. For example, there are no new bundle versions in the repository that are acceptable in accordance with the application's associated application descriptor.

If no changes are possible, then the user is informed of this fact at step 340 and processing ends.

Alternatively, the user's selections are automatically modified based on the output from the resolver at step 350 and processing loops round to step 300 where the new selections are input to the OSGi resolver. Naturally the selections may not actually be changed but rather the data simply input to the resolver.

The "no changes possible" outcome could still occur even on subsequent loops through the process. Assuming that the application resolves initially, looking at the bundle repository or repositories it can be seen that there are n other possible sets of bundle version choices that could be made. If n=0, there are no other changes possible. If n>0, it may be that none of these other sets of version choices resolve. This won't be realized until an attempt has been made to resolve the application with 'no preference' set for every bundle, and a result has been returned which is equivalent to the initial set of bundles. The way in which a pass or a fail determination is made at step 210 of FIG. 4 is described in more detail, in accordance with one embodiment, and with respect to FIG. 6.

Output is received from the OSGi resolver at step 400. It is determined at step 410 whether this output includes failure messages. Failure messages indicate that the OSGi resolver was unable to resolve the requested updates to the application. For example, a user requested that bundle A is upgraded to a new version, but if bundle A is upgraded to that version, it also needs bundle B at a newer version. The user has, however, specified that bundle B should either remain at its current version or be upgraded to a version that does not meet the requirement of bundle A.

If no failure messages are present, then processing ends because there is no reason why the requested update should not work.

If there are failure messages present at step 410, then in accordance with the first embodiment, at step 420, those failure messages are identified that are relevant to a bundle, or a package, service or other resource (entity) exported by a bundle, where the bundle is one listed via the processing of FIG. 3.

Note, that there may be several types of failure messages. For example, the version of bundle C may be selectable via FIG. 3. This new version of bundle C requires a package P which is not available from any bundle in the bundle repository. If this latest version of bundle C is selected, then bundle C will not resolve and will not be included in the result set. There will then be further failure messages relating to the absence of packages normally provided by bundle C. These latter messages are secondary: the primary failure is the lack of package P. Thus the system preferably presents the most important failure messages first, or even removes such 'secondary' failure messages altogether before presentation to the user.

Information on the failure messages is the information provided to the user at step 230 in order to allow them to make new selections at step 240, as shown in FIG. 4. The failure messages themselves may not provide enough information for the user to make an informed choice. For example, a user may have requested that bundle B remains at version 1.2 whilst bundle C is upgraded to version 1.4. This might cause a failure because bundle C requires a package from bundle B at version 1.3. In order for the system to work this out, it will be necessary to look at the repository metadata to see what bundles export the package, and then to work out whether any of them were from available versions of bundle B that the user could have selected but did not. In this example, the package is available from version 1.3 of bundle B and version 1.3 is within the repository. The system can then provide the user with the necessary level of detail.

Figure 6:
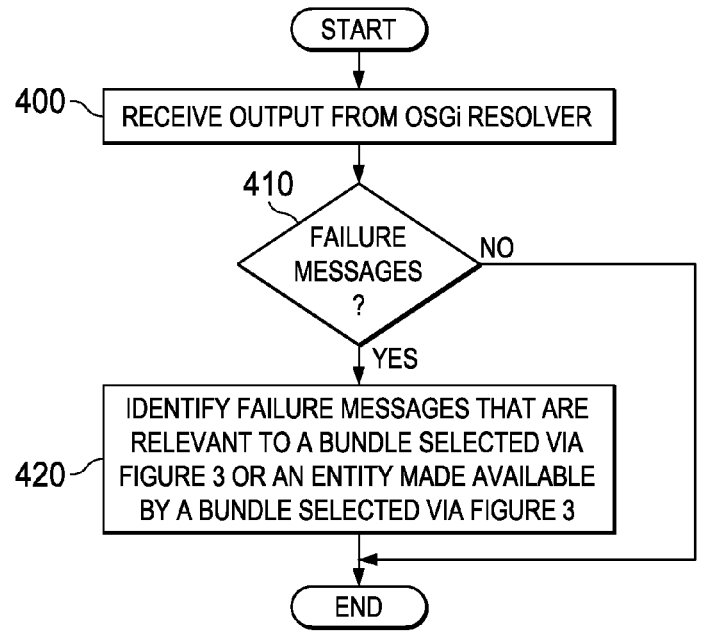

The processing of FIG. 6 ends.

Figure 7:
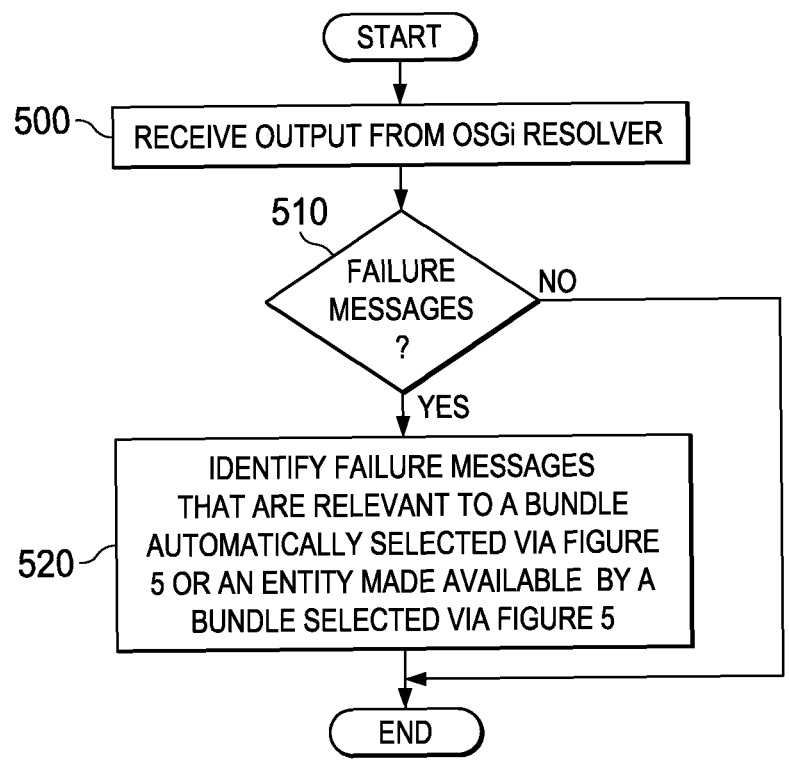

The way in which a pass or a fail determination is made at step 310 of FIG. 5 is described in more detail, in accordance with one embodiment and with respect to FIG. 7.

Output is received from the OSGi resolver at step 500. It is determined at step 510 whether this output includes failure messages. As discussed with respect to FIG. 6, failure messages indicate that the OSGi resolver was unable to satisfy the requested updates to the application.

If no failure messages are present, then processing ends because there is no reason why the requested update should not work.

If there are failure messages present at step 510, then those failure messages are identified at step 520 that relate to a bundle, or a package, service or other resource (entity) exported by a bundle, where a bundle is one listed via the processing of FIG. 5.

By way of example, the user asked to upgrade bundle B from 1.1 to 1.2 while keeping bundle A at 1.5 and bundle C is specified as no preference. This then failed because bundle B at 1.2 required a package 'foo' available in A 1.7 but not in A 1.5. The system would look through the repository metadata to see what bundles exported 'foo', and then to work out whether any of them were from available versions of bundles A or C that the user could have selected but did not.

Once again, that there may be several types of failure messages. The system preferably presents the most important failure messages first, or even removes 'secondary' failure messages altogether before presentation to the user.

The errors that remain are preferably used to determine how to automatically modify the user's selections at step 350 of FIG. 5. The approach for analyzing the error messages and transforming them into something more meaningful has been discussed in the previous embodiment. Preferably the minimal changes possible are made. Thus, if it is clear that failure is due to a missing package and the failure message indicates that this package is found in a later version of a listed module, then the system will upgrade to that later version only, rather than an even more up to date version also found in the repository. Changes are preferably only made to modules for which failure messages are produced, and the minimum necessary version change made to any bundles for which the user has expressed a preference. It is possible that all failures can be resolved without changing the version of all of the bundles that produced failures, or by changing the version of a bundle that did not exhibit a failure. In this case, the system will choose a solution that is least different to the original request from the user. An original failure message might be output with an additional message saying, for example: "The system identified a consistent set of bundles, similar to those previously selected, that could be used for upgrade. The set of bundles is available below."

The processing of FIG. 7 ends.

It will be appreciated by one of ordinary skill in the art that even with the automatic solution, the system may suggest to the user the changes that it proposes to make and allow the user to cancel out or even modify the suggestions. Thus, a solution is provided that attempts to update resources (bundles) gradually. Initially, the system tries to resolve an application in accordance with the options specified by the user. For example, this may be attempting to upgrade those bundles selected whilst fixing the versions of any other bundles at their currently deployed version. The system then gradually loosens the constraints until a dependency resolution is successfully accomplished. While these incremental changes are not guaranteed to succeed, the first that does will have less impact across the dependency network than existing solutions.

It will be appreciated by one of ordinary skill in the art that the minimal set of changes specified by the user may not be resolvable but ideally it will not be necessary to upgrade all bundles to the most recent version present in the bundle repository that is acceptable within the meaning of the application's descriptor.

It will further be appreciated by one of ordinary skill in the art that whilst the invention has been described in terms of OSGi, the invention is not intended to be limited to such. Rather the invention is applicable to any environment in which an application comprises a plurality of modules which may exist at a variety of versions.

At least some of those modules interdepend on others of the modules. Dependencies may be declared in metadata, or determined by inspection of the modules themselves.

Whilst the majority of the description has concerned itself with upgrading one or more modules within an application to a newer version, the invention is not intended to be limited to such. It equally covers downgrading module versions. A user may choose to upgrade some modules, downgrade others, specify no preference for others, and leave some modules at their current version level. The point here is that a solution is provided which tries to minimize the amount of change made to an application based on a user's initially specified requirements. It will be appreciated by one of ordinary skill in the art that modifying one module's version whilst keeping another module version the same may generate failure messages. This is because, for example, the changed version may require the other module to be at a different version level.

Changes can be minimized by preferably only disallowing requested module version changes when failure messages are produced for those modules. Thus for example, module A is at version 1.2, module B is at version 1.3 and module C is at version 1.2. It is decided to upgrade module A to version 1.5 and that B should be kept at 1.3. The resolver determines that a required service is missing and from looking at the repository metadata it can be determined that this is because B is required to be at version 1.4. Thus, it either suggested to the user that they might like to upgrade B to version 1.4 or the system may automatically attempt this modification. The system preferable always attempts to perform any specified upgrades or downgrades whilst indicating when a version that had been fixed, may have to change.

Advantageously, it is no longer necessary for the system to aggressively resolve modules to the latest version level available in the bundle repository.

It will further be appreciated by one of ordinary skill in the art that if a bundle is deemed necessary but this bundle is not initially specified as part of the application (via the application manifest), that bundle can be brought into the application if it exists in the bundle repository.

It will further be appreciated by one of ordinary skill in the art that package dependencies are only one sort of dependency and that others are equally valid. In OSGi, a bundle may declare direct dependencies on other bundles by name, and may also include references to services offered by code in other bundles. Thus, OSGi has bundle, package and service dependencies. A non-OSGi system might introduce different sorts of dependency again.

What is claimed is:

1. An apparatus for modifying an application comprising a plurality of modules, the apparatus comprising: a computer; a component for presenting a user with a list of the plurality of modules; a component for enabling the user to specify input regarding any permitted version modifications for the modules listed; a component for determining whether the requested modifications are possible, one or more failure messages being output when any of the requested modifications are not possible; and a component for using at least one of the failure messages to enable modification of the initial input provided by the user, wherein the component for using at least one of the failure messages to enable modification of the initial selection provided by the user comprises: a component for using at least one of the failure messages to automatically modify the input initially provided; and a component for providing the modified input to a component responsible for determining whether any specified modifications are possible, wherein the component for using at least one of the failure messages to automatically modify the input initially provided comprises: a component for determining from a failure message that a required entity is missing; a component for identifying whether the required entity is provided by a module at a version that is accessible to the application; and a component for selecting the accessible module.

2. The apparatus of claim 1, wherein the component for using at least one of the failure messages to enable modification of the initial input provided by the user comprises:
   a component for presenting the user with information based on at least one of the failure messages;
   a component for receiving input from the user with respect to how to modify the initial input provided by the user; and
   a component for providing the modified input to a component responsible for determining whether any specified modifications are possible.

3. The apparatus of claim 2, wherein the component for presenting the user with information based on at least one of the failure messages comprises:
   a component for determining from a failure message that a required entity is missing; and
   a component for identifying whether the required entity is provided by a module at a version that is accessible to the application;
   a component, responsive to identifying that the required entity is provided by a module at a version that is accessible to the application, for indicating to the user that the accessible module version should be selected.

4. The apparatus of claim 1, wherein the component for using at least one of the failure messages to automatically modify the input initially provided comprises: a component for selecting the minimal set of changes necessary based on the failure messages produced.

5. The apparatus of claim 1, wherein the component for using at least one of the failure messages comprises:
   a component for identifying those failure messages which relate to a module listed or which relate to an entity made available by a module listed.

6. The apparatus of claim 1, wherein the component for using at least one of the failure messages comprising:
   a component for disregarding a failure message when the error to which it relates has already been highlighted by another failure message.

7. The apparatus of claim 1, wherein permitted version modifications comprise at least one of:
   a version upgrade, a version downgrade, and an indication that there is no preference.

8. A computer program product comprising program code stored on a computer that is operable, when said program code is run on the computer, for modifying an application comprising a plurality of modules by performing steps of:

presenting a user with a list of the plurality of modules;
enabling the user to specify input regarding any permitted version modifications for the modules listed;
determining whether the requested modifications are possible, one or more failure messages being output when any of the requested modifications are not possible; and
using at least one of the failure messages to enable modification of the initial input provided by the user, wherein using at least one of the failure messages to enable modification of the initial selection provided by the user comprises: using at least one of the failure messages to automatically modify the input initially provided; and providing the modified input to a component responsible for determining whether any specified modifications are possible, wherein the step of using at least one of the failure messages to automatically modify the input initially provided comprises: determining from a failure message that a required entity is missing; identifying whether the required entity is provided by a module at a version that is accessible to the application; and selecting the accessible module.

9. The computer program product of claim 8, further comprising program code that is operable, when said program code is run on said computer, to perform steps of:
presenting the user with information based on at least one of the failure messages;
receiving input from the user with respect to how to modify the initial input provided by the user; and
providing the modified input to a component responsible for determining whether any specified modifications are possible.

10. The computer program product of claim 9, wherein the step of presenting the user with information based on at least one of the failure messages comprises:
determining from a failure message that a required entity is missing;
identifying whether the required entity is provided by a module at a version that is accessible to the application; and
responsive to identifying that the required entity is provided by a module at a version that is accessible to the application, indicating to the user that the accessible module version should be selected.

11. The computer program product of claim 8, wherein the step of using at least one of the failure messages to automatically modify the input initially provided comprises: selecting the minimal set of changes necessary based on the failure messages produced.

12. The computer program product of claim 8, wherein the step of using at least one of the failure messages comprises:
identifying those failure messages which relate to a module listed or which relate to an entity made available by a module listed.

13. The computer program product of claim 8, wherein the step of using at least one of the failure messages comprising:
disregarding a failure message when the error to which it relates has already been highlighted by another failure message.

14. The computer program product of claim 8, wherein permitted version modifications comprise at least one of:
a version upgrade, a version downgrade, and an indication that there is no preference.

* * * * *